United States Patent
Zhao et al.

(10) Patent No.: US 11,659,419 B2
(45) Date of Patent: May 23, 2023

(54) METHOD, SYSTEM AND APPARATUS IDENTIFYING AN INTERFERING AERIAL VEHICLE USER EQUIPMENT WITHIN A COMMUNICATIONS SYSTEM

(71) Applicant: Nokia Technologies Oy, Espoo (FI)

(72) Inventors: Yan Zhao, Shanghai (CN); Istvan Z. Kovacs, Aalborg (DK); Jeroen Wigard, Klarup (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/754,820

(22) PCT Filed: Oct. 13, 2017

(86) PCT No.: PCT/CN2017/106090
§ 371 (c)(1),
(2) Date: Apr. 9, 2020

(87) PCT Pub. No.: WO2019/071578
PCT Pub. Date: Apr. 18, 2019

(65) Prior Publication Data
US 2021/0195448 A1    Jun. 24, 2021

(51) Int. Cl.
*H04W 24/08*    (2009.01)
*H04W 24/02*    (2009.01)
*H04W 88/08*    (2009.01)

(52) U.S. Cl.
CPC .......... *H04W 24/08* (2013.01); *H04W 24/02* (2013.01); *H04W 88/08* (2013.01)

(58) Field of Classification Search
None
See application file for complete search history.

(56) References Cited

U.S. PATENT DOCUMENTS

2017/0019800 A1    1/2017  Liu et al.
2020/0220612 A1*   7/2020  Thomas ............... H04B 17/309

FOREIGN PATENT DOCUMENTS

CN    102404808 A    4/2012
CN    103518333 A    1/2014
(Continued)

OTHER PUBLICATIONS

"Interference Detection of Aerial Vehicles", Sequans Communications, 3GPP TSG RAN WG1 #90-bis, R1-1718298, Oct. 2017, 3 pages.

(Continued)

*Primary Examiner* — Adolf Dsouza
(74) *Attorney, Agent, or Firm* — Harrington & Smith

(57) ABSTRACT

A method for identifying an interfering aerial vehicle user equipment within a communications system, the method including determining for the interfering aerial vehicle user equipment a first signal measurement value is less than a first threshold value; and determining for the interfering aerial vehicle user equipment a second signal measurement value related to the radio interface between the interfering aerial vehicle user equipment and a serving cell access point is greater than a second threshold value, and the first signal measurement value is determined based on a comparison between the second signal measurement value and further signal measurement values related to the radio interface between the interfering aerial vehicle user equipment and at least one further cell access point.

20 Claims, 12 Drawing Sheets

(56) References Cited

FOREIGN PATENT DOCUMENTS

CN 107018571 A 8/2017
WO WO-2019/004925 A1 1/2019

OTHER PUBLICATIONS

"Initial views on potential problems and solutions for aerial vehicles", NTT DOCOMO, Inc., 3GPP TSG RAN WG2 #98, R2-1704333, May 2017, 5 pages.
"Consideration for interference detection and measurement enhancement for drone UE", Lenovo, Motorola Mobility, 3 GPP TSG RAN WG2 Meeting #99, R2-1708973, Aug. 2017, 4 pages.

* cited by examiner

METHOD, SYSTEM AND APPARATUS IDENTIFYING AN INTERFERING AERIAL VEHICLE USER EQUIPMENT WITHIN A COMMUNICATIONS SYSTEM

CROSS REFERENCE TO RELATED APPLICATION

This patent application is a U.S. National Stage application of International Patent Application Number PCT/CN2017/106090 filed Oct. 13, 2017, which is hereby incorporated by reference in its entirety.

FIELD

The present application relates to a method, apparatus, and computer program and in particular but not exclusively to methods, apparatus, and computer programs related to identification of high interference aerial vehicle user equipment within a cellular communications system.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE) or mobile station (MS). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. Certain releases of 3GPP LTE (e.g., LTE Rel-11, LTE Rel-12, LTE Rel-13) are targeted towards LTE-Advanced (LTE-A). LTE-A is directed towards extending and optimising the 3GPP LTE radio access technologies.

In 3GPP RAN #75, a new Study Item (SI) on "Study on Enhanced Support for Aerial Vehicles (AV)" was approved. The objective of the study is to investigate the ability for aerial vehicles with using terrestrial LTE network deployments. An aerial vehicle flying at low altitude relative to a base station (BS) antenna height behaves like a conventional terrestrial UE due to the nature of the propagation channel. However once an aerial vehicle is flying well above the BS antenna height line-of-sight propagation between the AV and neighbouring base stations causes the AV to become more visible to multiple cells. This in turn renders the AV more susceptible to suffer from interference in the downlink (from the base station to the aerial vehicle) and generate more interference in uplink (from the aerial vehicle to the base station) at the same time. This effect is represented by the "extreme interference AV" in the 3GPP RAN #75 paper.

Some objectives were identified as part the study item for potential enhancements related to RAN1/2:

Interference mitigation solutions for improving system-level performance in both UL and DL [RAN1];

Solutions to detect whether UL signal from an air-borne UE increases interference in multiple neighbour cells and whether an air-borne UE incurs interference from multiple cells [RAN1, RAN2]; and Handover: Identify if enhancements in terms of cell selection and handover efficiency as well as robustness in handover signalling can be achieved. [RAN2, RAN1].

Before achieving the objectives mentioned above, the aerial vehicles creating the 'extreme interference' should be identified.

SUMMARY

In a first aspect there is provided a method for identifying an interfering aerial vehicle user equipment within a communications system, the method comprising: determining for the interfering aerial vehicle user equipment a first signal measurement value is less than a first threshold value; and determining for the interfering aerial vehicle user equipment a second signal measurement value related to the radio interface between the interfering aerial vehicle user equipment and a serving cell access point is greater than a second threshold value, wherein the first signal measurement value is determined based on a comparison between the second signal measurement value and further signal measurement values related to the radio interface between the interfering aerial vehicle user equipment and at least one further cell access point.

The second signal measurement value may be a reference signal received power value, the reference signal being received by the interfering aerial vehicle user equipment and transmitted by the serving cell access point.

The further signal measurement values related to the radio interface between the interfering aerial vehicle user equipment and at least one further cell access point may be at least one further cell reference signal received power value, related to a reference signal transmitted by the at least one further cell access point and received by the interfering aerial vehicle user equipment.

The first signal measurement value may be an approximation to a wideband signal to interference and noise ratio.

The method may further comprise determining at least one of the first threshold value and the second threshold value by determining a network planning parameter.

The method may further comprise determining the first threshold value by: identifying for the serving cell access point a plurality of terrestrial user equipment; determining for each of the identified terrestrial user equipment a signal measurement value related to the radio interface between the terrestrial user equipment and the serving cell access point and further signal measurement values related to the radio interface between the terrestrial user equipment and at least one further cell access point; determining for each of the identified terrestrial user equipment a signal measurement ratio value based on a comparison of the signal measurement value related to the radio interface between the terrestrial user equipment and the serving cell access point and the further signal measurement values related to the radio interface between the terrestrial user equipment and at least one further cell access point; and identifying a percentile point of a cumulative distribution function of the identified terrestrial user equipment signal measurement ratio values as the first threshold value.

The method may further comprise determining the second threshold value by: identifying any serving cell access point terrestrial user equipment with signal measurement ratio values below the first threshold value as cell-edge terrestrial user equipment; and identifying a percentile point of a cumulative distribution function of the identified cell-edge terrestrial user equipment signal measurement values related to the radio interface between the identified user equipment and the serving cell access point as the second threshold value.

The identified cell-edge terrestrial user equipment signal measurement value related to the radio interface between the identified user equipment and the serving cell access point may be a reference signal received power value, the reference signal being received by the user equipment and transmitted by the serving cell access point.

The first threshold value may comprise a cell-edge threshold. Determining for each of the identified terrestrial user equipment the signal measurement ratio value may comprise: converting the signal measurement value related to the radio interface between the terrestrial user equipment and the serving cell access point and the further signal measurement values related to the radio interface between the terrestrial user equipment and at least one further cell access point to a linear scale; and computing a ratio between the converted signal measurement value related to the radio interface between the terrestrial user equipment and the serving cell access point and converted further signal measurement values related to the radio interface between the terrestrial user equipment and at least one further cell access point as the signal measurement ratio value.

The method may further comprise determining the first signal measurement value by: determining the second signal measurement value related to the radio interface between the interfering aerial vehicle user equipment and a serving cell access point; determining the further signal measurement values related to the radio interface between the interfering aerial vehicle user equipment and at least one further cell access point; converting the second signal measurement value and the further signal measurement values to a linear scale; computing a ratio between the converted second signal measurement value and converted further signal measurement values as the first signal measurement value.

The method may be implemented within at least one of: the serving cell access point; and the interfering aerial vehicle user equipment.

The method implemented within the serving cell access point may further comprise signalling from the serving cell access point to the interfering aerial vehicle user equipment, the interfering aerial vehicle user equipment as an extreme interfering aerial vehicle user equipment.

The method implemented within the interfering aerial vehicle user equipment may further comprise signalling from the interfering aerial vehicle user equipment to the serving cell access point, the interfering aerial vehicle user equipment as an extreme interfering aerial vehicle user equipment.

The method may further comprise performing inter-cell interference coordination for the identified interfering aerial vehicle user equipment.

The method may further comprise performing inter-cell interference coordination for the identified interfering aerial vehicle user equipment, the interfering aerial vehicle user equipment identified by an indicator.

According to a second aspect there is provided an apparatus comprising at least one processor, and at least one memory including computer program code, wherein the at least one memory and the computer program code are configured, with the at least one processor, to cause the apparatus to: determine for an interfering aerial vehicle user equipment a first signal measurement value is less than a first threshold value; and determine for the interfering aerial vehicle user equipment a second signal measurement value related to the radio interface between the interfering aerial vehicle user equipment and a serving cell access point is greater than a second threshold value, wherein the first signal measurement value is determined based on a comparison between the second signal measurement value and further signal measurement values related to the radio interface between the interfering aerial vehicle user equipment and at least one further cell access point.

The second signal measurement value may be a reference signal received power value, the reference signal being received by the interfering aerial vehicle user equipment and transmitted by the serving cell access point.

The further signal measurement values related to the radio interface between the interfering aerial vehicle user equipment and at least one further cell access point may be at least one further cell reference signal received power value, related to a reference signal transmitted by the at least one further cell access point and received by the interfering aerial vehicle user equipment.

The first signal measurement value may be an approximation to a wideband signal to interference and noise ratio.

The at least one processor is further caused to determine at least one of the first threshold value and the second threshold value by determining a network planning parameter.

The at least one processor may be further caused to determine the first threshold value.

The at least one processor may be further caused to determine the first threshold value by being caused to: identify for the serving cell access point a plurality of terrestrial user equipment; determine for each of the identified terrestrial user equipment a signal measurement value related to the radio interface between the terrestrial user equipment and the serving cell access point and further signal measurement values related to the radio interface between the terrestrial user equipment and at least one further cell access point; determine for each of the identified terrestrial user equipment a signal measurement ratio value based on a comparison of the signal measurement value related to the radio interface between the terrestrial user equipment and the serving cell access point and the further signal measurement values related to the radio interface between the terrestrial user equipment and at least one further cell access point; and identify a percentile point of a cumulative distribution function of the identified terrestrial user equipment signal measurement ratio values as the first threshold value.

The processor may be further caused to determine the second threshold value by being caused to: identify for the serving cell access point terrestrial user equipment with first signal measurement values below the first threshold value as cell-edge terrestrial user equipment; and identify a percentile point of a cumulative distribution function of the identified cell-edge terrestrial user equipment signal measurement values related to the radio interface between the identified user equipment and the serving cell access point as the second threshold value.

The identified cell-edge terrestrial user equipment signal measurement value related to the radio interface between the identified user equipment and the serving cell access point may be a reference signal received power value, the reference signal being received by the user equipment and transmitted by the serving cell access point.

The processor caused to determine for each of the identified terrestrial user equipment the signal measurement ratio value may be further caused to: convert the signal measurement value related to the radio interface between the terrestrial user equipment and the serving cell access point and the further signal measurement values related to the radio interface between the terrestrial user equipment and at least one further cell access point to a linear scale; and compute a ratio between the converted signal measurement value related to the radio interface between the terrestrial user equipment and the serving cell access point and converted further signal measurement values related to the radio interface between the terrestrial user equipment and at least one further cell access point as the signal measurement ratio value.

The first threshold value may comprise a cell-edge threshold.

The processor may be further caused to determine the first signal measurement value by being caused to: determine the second signal measurement value related to the radio interface between the interfering aerial vehicle user equipment and a serving cell access point; determine the further signal measurement values related to the radio interface between the interfering aerial vehicle user equipment and at least one further cell access point; convert the second signal measurement value and the further signal measurement values to a linear scale; compute a ratio between the converted second signal measurement value and converted further signal measurement values as the first signal measurement value.

The apparatus may comprise at least one of: the serving cell access point; and the interfering aerial vehicle user equipment.

The apparatus may be the serving cell access point and the processor may be further caused to signal from the serving cell access point to the interfering aerial vehicle user equipment that the interfering aerial vehicle user equipment is an extreme interfering aerial vehicle user equipment.

The apparatus may be the interfering aerial vehicle user equipment and the processor may be further caused to signal from the interfering aerial vehicle user equipment to the serving cell access point that the interfering aerial vehicle user equipment is an extreme interfering aerial vehicle user equipment.

The processor may be further caused to perform inter-cell interference coordination for the identified interfering aerial vehicle user equipment.

The processor may be further caused to perform inter-cell interference coordination for the identified interfering aerial vehicle user equipment, the interfering aerial vehicle user equipment identified by an indicator.

The apparatus may comprise at least one processor and at least one memory including computer code for one or more programs.

In another aspect there is provided a computer program embodied on a non-transitory computer-readable storage medium, the computer program comprising program code for providing any of the above methods.

In another aspect there is provided a computer program product for a computer, comprising software code portions for performing the steps of any of the previous methods, when said product is run.

A computer program comprising program code means adapted to perform the method(s) may be provided. The computer program may be stored and/or otherwise embodied by means of a carrier medium.

In the above, many different embodiments have been described. It should be appreciated that further embodiments may be provided by the combination of any two or more of the embodiments described above.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1, 2a and 2b to assist in understanding the technology underlying the described examples.

Figure 1:
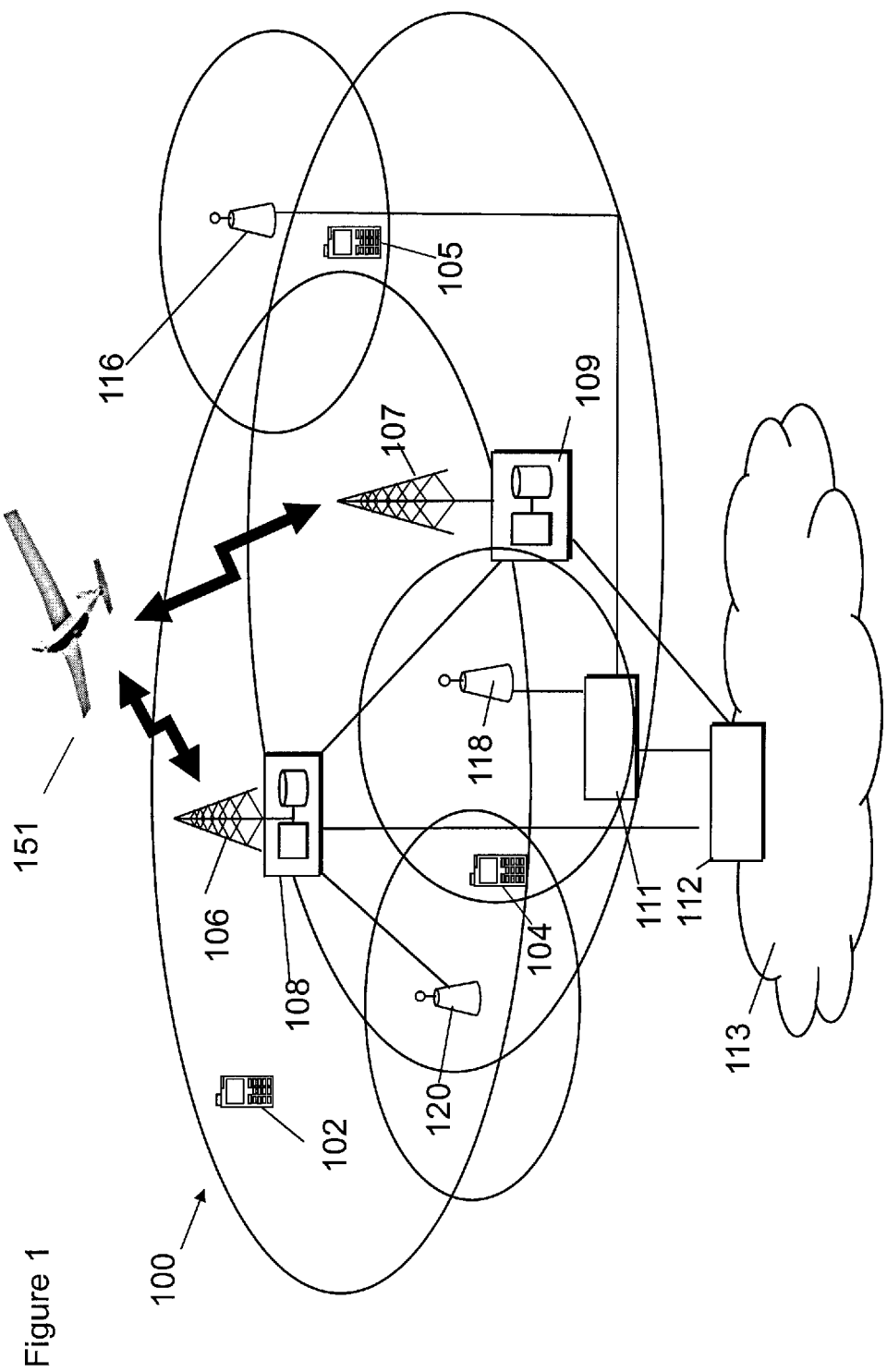
FIG. 1 shows a schematic diagram of an example communication system comprising a base station and a plurality of communication devices including an aerial vehicle communication device.
Figure 2A:
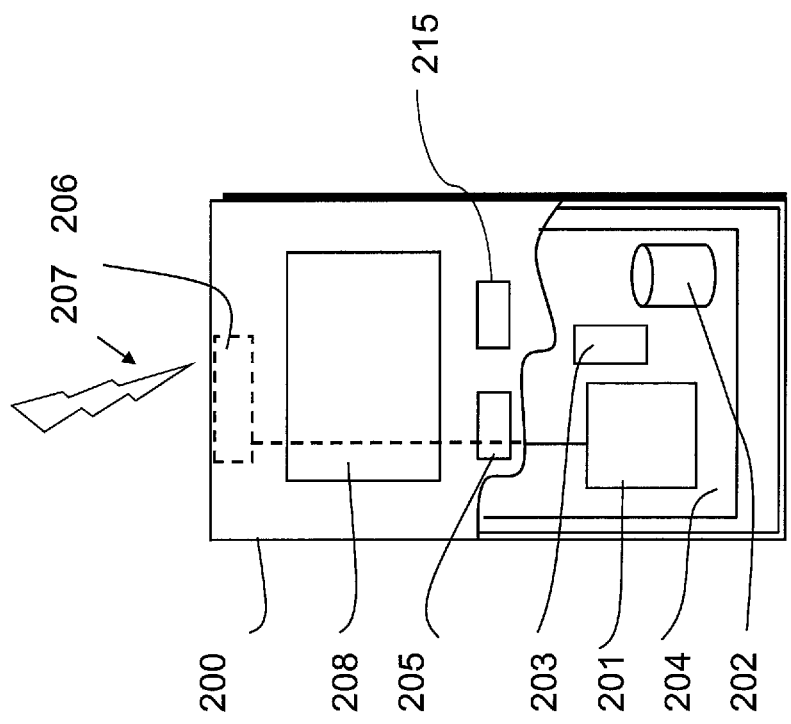
FIG. 2a shows a schematic diagram of an example communication device.

In a wireless communication system 100, such as that shown in FIG. 1, conventional mobile communication devices or user equipment (UE) 102, 104, 105 are provided wireless access via at least one base station or similar wireless transmitting and/or receiving node or point. Base stations (BTS, NodeB (NB), enhanced NodeB (eNB) are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller (RNC). In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller or a base station controller (BSC).

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

As discussed previously the wireless communication system 100 may further comprise an aerial vehicle (AV) 151 equipped with user equipment, mobile station or communications device capability. An AV 151 with wireless communication system capability may be referred to as an AV-UE. The AV-UE 151 may be any suitable AV. For example the AV-UE may be a lighter-than-air vehicle such as an airship or dirigible balloon, or may be a heavier-than-air vehicle such as aeroplane or helicopter. In some embodiments the AV-UE is unmanned, in some other embodiments the AV-UE is manned. Furthermore in some embodiments the AV-UE is autonomously or partially autonomously controlled. The AV-UE's relative elevation compared to the height of the antenna used by the base stations may enable the AV-UE to be in line of sight with more than one base station. For example as shown in FIG. 1 user equipment 102 is in communications range with a single base station 106 the AV-UE 151 is in communications range with multiple base stations 106 and 107. As discussed earlier this may lead to significant interference issues of which there is currently research to mitigate. The current disclosure is aimed at identifying AV based communication devices which cause such extreme interference instantly.

A possible schematic view of a mobile communication device or UE 200 suitable for integration within an AV-UE 151 or in general a AV-UE compatible communications device 200 will now be described in more detail with reference to FIG. 2a. Such a communication device 200 is often referred to as user equipment (UE), mobile station (MS) or terminal. An appropriate mobile communication device may be provided by any device capable of sending and receiving radio signals. Non-limiting implementations of the communications device include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, an IoT device or any combinations of these or the like.

A mobile communication device may provide, for example, communication of data for carrying communications such as voice, electronic mail (email), text message, multimedia, AV telemetry, AV captured images, control signals for controlling the AV, and so on. Non-limiting examples of services provided by the communications comprise data communication for example telemetry and/or images from the AV to a remote operator and control or commands issued by the remote operator to the AV for controlling the AV.

The communications device 200 may receive signals over an air or radio interface 207 via appropriate apparatus for receiving (e.g., a receiver) and may transmit signals via appropriate apparatus for transmitting radio signals (e.g., a transmitter). In FIG. 2a transceiver apparatus is designated schematically by block 206. The transceiver apparatus 206 may be provided for example by means of a radio part and associated antenna arrangement. The antenna arrangement may be arranged internally or externally to the communications device 200.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The AV may control the operation of the mobile device by means of a suitable interface such as input/output ports 205 and 215. In some embodiments where the AV is manned the operation of the communications device 200 may be performed by voice commands, touch sensitive screen or pad, combinations thereof or the like. The communications device 200 may in some embodiments be equipped with a display 208, a speaker and a microphone. Furthermore the communications device 200 may comprise appropriate connectors (either wired or wireless) to other devices and/or other components of the AV 151, for example control surface servos etc.

Figure 2B:
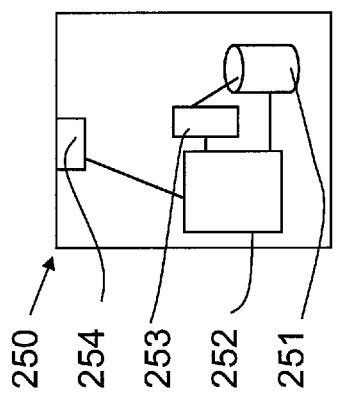
FIG. 2b shows a schematic diagram of an example control apparatus.

FIG. 2b shows an example of a control apparatus for a communication system, for example to be coupled to and/or for controlling a station of an access system, such as a RAN node, e.g. a base station, (e)node B or 5G AP, a central unit of a cloud architecture or a node of a core network such as an MME or S-GW, a scheduling entity, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus or access point 250 can be arranged to provide control on communications in the service area of the system. The control apparatus or access point 250 comprises at least one memory 251, at least one data processing unit 252, 253 and an input/output interface 254. Via the interface the control apparatus can be coupled to a receiver and a transmitter of the base station. The receiver and/or the transmitter may be implemented as a radio front end or a remote radio head. For example the control apparatus 250 or processor 251 can be configured to execute an appropriate software code to provide the control functions.

The AV-UE 151 communication device 200 (and the other communication devices within the communications system) may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on. Signalling mechanisms and procedures, which may enable a device to address in-device coexistence (IDC) issues caused by multiple transceivers, may be provided with help from the LTE network. The multiple transceivers may be configured for providing radio access to different radio technologies.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile network architecture known as the Evolved Universal Terrestrial Radio Access Network (E-UTRAN). Base stations or access nodes of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of a radio access system comprise those provided by base stations of systems that are based on technologies such as wireless local area network (WLAN) and/or WiMax (Worldwide Interoperability for Microwave Access). A base station can provide coverage for an entire cell or similar radio service area.

As discussed above the concept discussed hereafter in further detail is identifying an extreme interference AV (i.e. an AV-UE which has extreme interference status) efficiently. An airborne UE (AV-UE) as discussed above would likely see more cells with similar signal strength and similarly an airborne UE (AV-UE) would likely see more far away cells than a ground UE due to the difference in propagation conditions. The current 3GPP study item discusses an example where an UE could trigger a measurement report of e.g. X number of cells which have signal strength above −90 dBm and below −70 dBm. Similarly the 3GPP study item discusses another possibility of triggering reports when UE sees certain cells, e.g. certain configured far away cells. As these mentioned trigger conditions would trigger measurement results as soon as UE is airborne, these could be used by the network to identify when an "LTE capable" UE is flying.

Potential issues that are raised by the study item are for example:

1. How to decide the number (e.g. X) of cells to be measured? Increasing X does not only improve identification stability but also increase aerial vehicle's computing complexity and power cost.

2. How to set the proper thresholds (e.g. reference signal received power–RSRP low_RSRP=−90 dBm, high_RSRP=−70 dBm) for aerial vehicles since the numbers of AVs within the environment are likely to be low with respect to terrestrial user equipment. These thresholds tightly depend on the actual wireless system deployment (i.e. LTE scenarios UMi [urban micro-cellular], UMa [urban macro-cellular model] and RMa [rural macro-cellular model]).

3. The aerial vehicle will require position information to identify a faraway or distant cell. This extra configuration information sent to the AV increases computing complexity and signalling cost. Furthermore there are issues with respect to the distance to which the AV-UE is able to report received signal strength parameters?

4. How to set a reporting distance or range and furthermore whether and how to adapt signal measurement with respect to weather effects?

As discussed in further detail with respect to the following embodiments following an AV-UE can be configured to deduce extreme interference status from downlink (DL) interference detection. The same procedure can be used at the serving eNB (access point) where the DL measurement reports from the AV-UE are available. In the following embodiments an indicator that an AV-UE is 'an extreme interference' AV-UE, may be one where the AV-UE has a very low downlink signal to interference and noise ratio (SINR). The extreme interference AV-UE furthermore usually has a very strong serving cell reference signal received power (RSRP). This combination of very low downlink SINR and high RSRP is a distinct difference from a conventional terrestrial UE.

A UE with very low SINR is typically a cell-edge UE (in other words a UE which defines the practical edge of coverage for the cell). Although wideband SINR is ideal method to sort cell-edge UE from the other UEs, it is difficult to implement in practice.

In the embodiments described hereafter an approximation SINR is determined using a difference between a serving cell RSRP and the remaining N strongest neighbouring cell RSRPs. As the LTE RSRP is wideband, the resulting determined approximation is also wideband.

In combining these indications a solution to identify extreme interference status may be defined. For example in some embodiments the AV-UE has 'an extreme interference' status if the following conditions are satisfied for the given time duration:

AV-UE's approximation SINR is below an approximation-SINR-threshold value, which means the AV-UE is a cell-edge UE (i.e. very low SINR); and AV-UE's serving cell RSRP is above the extreme-RSRP-threshold value, which means the AV-UE is receiving a very strong signal from its serving cell.

Since these extreme interference AV-UEs are different from the conventional terrestrial UEs, the embodiments described hereafter show methods and apparatus configured to derive both approximate-SINR-threshold and extreme-RSRP-threshold values. These values may be derived in some embodiments from analysed conventional terrestrial UEs. An aspect associated with the embodiments described herein is the use of this analysis (deriving statistics related to conventional terrestrial UEs) to identify/select the extreme interference AV-UEs.

In some embodiments each access point (for example an eNB) is configured to sort conventional terrestrial UEs from AV-UEs by any suitable manner. For example in some embodiment the identification of AV-UEs is run in each cell by performing an analysis (and making statistics) at different times (e.g. daylight, night, several days and so on) as AV-UEs are by nature typically transitory in other words they do not always exist within a single cell.

The embodiments as described hereafter describe example three modes or methods for identification of extreme interference AV UEs—at the UE itself, at the access point (eNB), and at both the UE and access point.

In embodiments where the UE itself performs the identification of extreme interference AV-UE status the UE is configured to receive information from the higher or top communications layers (e.g. receiving threshold values, the number of neighbouring cell RSRPs to be measured etc). In some embodiments when an AV-UE is identified as being an extreme interference AV-UE, for example after determining the above conditions, the AV-UE may in some embodiments be configured to mitigate its uplink (UL) interference by implementing a specific proactive approach. At the same time, the AV-UE may be configured to inform its serving cell or access point that an extreme interference AV-UE is present. In some embodiments the AV-UE is configured to implement signalling to indicate and identify itself as the extreme interference AV-UE. In some embodiments, in order to save signalling cost, an existing RSRP+RSRQ report mechanism may be used with a pair of special values (i.e. mismatched values) to indicate an extreme interference AV-UE.

Thus for example in some embodiments the AV-UE may be configured to indicate itself as an extreme interference AV-UE with a pair of special mismatched values on RSRP and RSRQ, e.g. RSRP_97 (more than −44 dBm, which means very higher signal from serving cell) and RSRQ_00 (less than −19.5 dB, which means very lower SINR), because this pair of mismatched values never appears in the conventional terrestrial UE at the same time.

In such embodiments, the access point (eNB) may be configured, after getting this extreme interference AV-UE indication, to adopt specific downlink/uplink (DL/UL) interference mitigation solutions for the identified extreme interference AV-UE.

In some embodiments the access point (for example the eNB) can be configured to detect and identify an extreme interference AV-UE based on periodic reports from the UE indicating the serving cell RSRP and N neighbouring cell RSRPs. In these embodiments the report comprises the determination of N+1 RSRPs by each UE.

In consideration of uplink open loop power control enhancement in the AV-UE, it is possible for access point (eNB) to indicate UE's interference status. Then the eNB may be configured to indicates an AV-UE as being an extreme interference AV-UE by signalling (e.g. add a one bit indicator in the downlink control information). Thus in some embodiments the access point (eNB) is configured to control or trigger the AV-UE to fulfill interference mitigation itself.

The access point (eNB) in some embodiments is configured to send this information to the AV-UE as when the AV-UE is identified as highly interfering/interfered the AV-UE may need to receive parameters or settings related to actions the AV-UE can perform to tackle the interference problem. For example these parameters or settings may be beam-steering options, power control, etc.

In some embodiments a hybrid or union of AV-UE and access point determination methods may be implemented to identify and attempt to mitigate an extreme interference AV-UE. These hybrid or union method as shown employ the RSRP report information.

Although in the examples shown herein use RSRP measurements from the LTE network there may be other measurements which produce similar effects in LTE networks, NR networks or other networks such as RSRQ, CSI-RSRP, RSSI and so on.

In some embodiments the first operation for identifying an extreme interference AV-UE is to determine a UE with a very low SINR.

Figure 3:
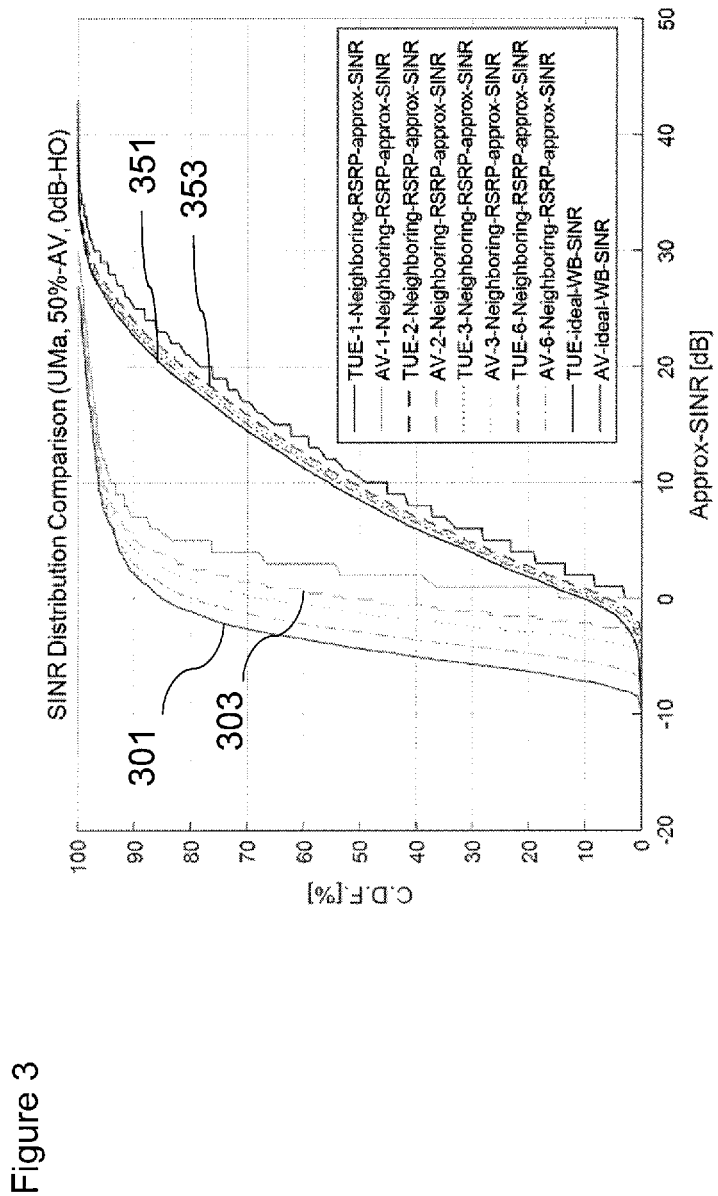
FIG. 3 shows a graph of example cumulative distribution functions of aerial vehicle and terrestrial user equipment (TUE) neighbouring RSRP based approximate-signal to interference and noise ratios.

As described earlier the embodiments as described herein rather than determine a wideband SINR for an UE (either terrestrial T-UE or Aerial Vehicle AV-UE) an approximate SINR is generated. The approximate SIR may be generated in some embodiments by the following:

1. Determine RSRP measurement in dBm
2. Convert RSRP dBm measurement to a linear scale, RSRP-mW
3. Compute SINR using the serving RSRP-mW and N neighbouring cells' RSRP-mWs In such a manner the calculated SIR can be thought of as an approximation of the ideal wideband SINR Since, for a typical terrestrial UE, most of strong interference cells are the first 2-3 neighbouring cells, a 2-neighboring-cell configuration can be used to generate a very good approximation to the wideband-SINR. For example with respect to FIG. 3, which shows simulated approximations to the SINR generated using N-neighbouring RSRP reports it can be seen that when compared to the ideal Terrestrial UE (TUE) wideband SINR 351 the TUE 2-neighbouring-cell RSRP approximation 353 matches the ideal wideband SINR. However with respect to AV-UEs with higher interference the AV-UE 2-neighbouring-cell RSRP approximation 303 is less accurate an approximation to the AV-UE ideal wideband SINR 301. As such in some embodiments more than 2 neighbouring cell RSRPs may be employed to generate an accurate approximation to the wideband SINR.

Furthermore in some embodiments a threshold approximation SINR value is determined (this is for cell-edge user equipment selection). In some embodiments this is performed by the access point (eNB).

Figure 4:
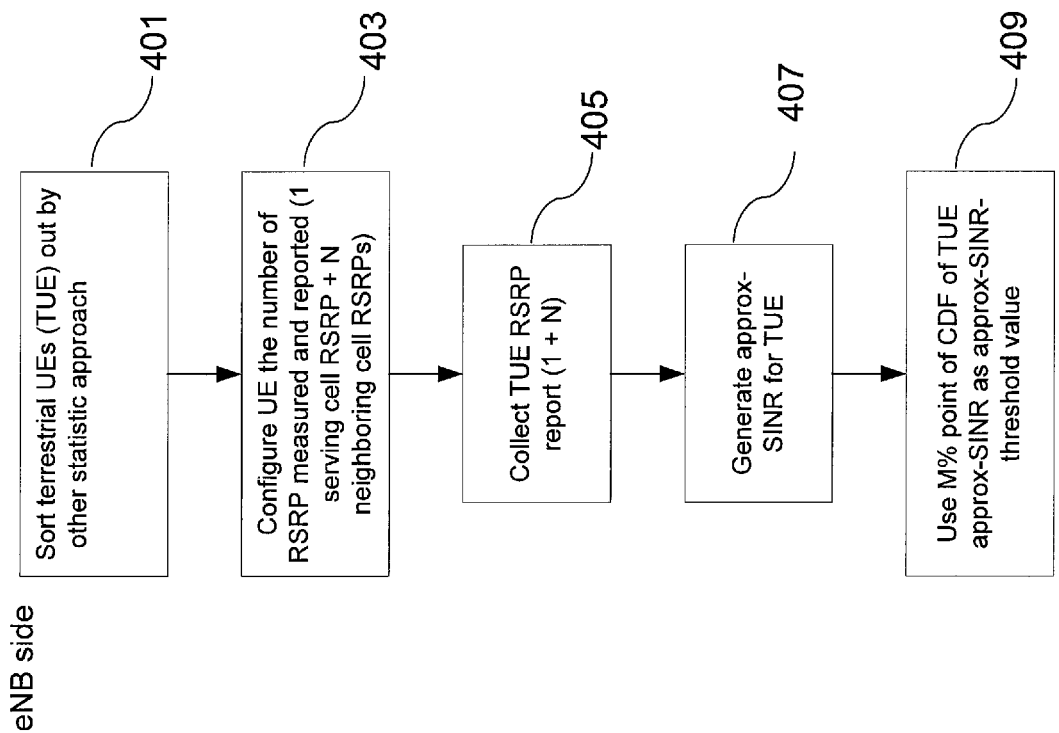
FIG. 4 shows a flow diagram of example methods for generating approximate-signal to interference and noise ratio thresholds for cell-edge UE selection.

With respect to FIG. 4 a first example method for determining the threshold approximation SINR value is shown.

In some embodiments the access point (eNB) is first configured to sort or categorize between the terrestrial user equipment (TUE) and the aerial vehicle user equipment (AV-UE). The sorting or categorization may be achieved using any known analysis or statistical analysis. For example the sorting may be performing by analysis of the UTM (Unmanned Aircraft System Traffic Management) connection. If the UE is connected to the UTM, it may be assumed with a high likelihood that the UE is or will be flying. Furthermore there may be a UE class for UAVs. Another possible sorting method is one of checking the GPS location of the UE through the UE GPS report, and more specifically the vertical coordinate in the GPS coordinates and comparing it to the ground level at the given location. A further example is an AV-UE identification method based on the patterns between RSRP measurement values and the received signal strength indicator (RSSI) values. This approach aims at recognizing introducing specific mobility measurement and signalling between eNBs for UEs which are determined to be airborne. The main steps of the procedure are a detection part based on UE standard 3GPP measurements and a detection algorithm to determine whether a UE is flying or on the ground. This is followed by a UE measurement report part where a minimum number of measurements are determined and by forcing the number of measurements to be high for a controlled and relative short duration by changing the trigger of the measurements reporting or by asking the UE directly to start reporting with regular intervals. Then as soon as it is determined with a reasonable likelihood that the UE is either on ground or airborne the measurement reporting mode should return to the normal mode in order to avoid overload from measurements.

The operation of sorting between the TUEs and AV-UEs associated with the access point is shown in FIG. 4 by step 401.

Having sorted or categorized between the TUEs and AV-UEs associated with the access point the access point may be configured to generate an approximation of the SINR threshold for cell-edge UE selection based on the terrestrial UE RSRP values.

This may be implemented by configuring the TUEs to measure and report reference signal received power (RSRP) values. Each TUE may be configured to measure and report RSRPs for the serving cell and for N neighbouring cells.

The operation of configuring the TUEs to measure and report RSRPs for the serving cell and for N neighbouring cells is shown in FIG. 4 by step 403.

The access point then may be configured to collect the TUE RSRP reports.

The collection of the TUE N+1 RSRP reports is shown in FIG. 4 by step 405.

The access point may then be configured to generate the approximation of the WB SINR from the TUE N+1 RSRP reports. For example the access point may use the method described above of: determining RSRP measurements in dBm; converting the RSRP dBm measurement to a linear scale; and computing a SIR between the serving RSRP-mW and N neighbouring cells' RSRP-mWs, where the SIR value is the approximation to the SINR.

The operation of determining the approximation to the SINR for the TUEs is shown in FIG. 4 by step 407.

Having determined the approximation to the SINR for the TUEs the approximation SINR (approx-SINR) threshold value may be calculated. For example the access point may be configured to use a M-th percentile point of the cumulative distribution function (CDF) of the TUE approximation SINR as the approx-SINR threshold value. In some embodiments this hybrid scenario with aerial vehicle(s) among terrestrial LTE network deployments, the access point may be configured to select a 5th percentile point of the cumulative distribution function (CDF) of UE throughput among terrestrial UE set as the (cell-edge) threshold, which is compatible with original cell edge definition in 3GPP. Since the throughput equates SINR in a sense, the embodiments uses the M-th percentile point of CDF of approx-SINR among terrestrial UEs as the approx-SINR-threshold value to select cell-edge UE. The M value isn't a fixed value and in some embodiments may be set to a slightly larger than 5% to increase the cell-edge UE the possibility of using additional interference mitigation scheme. In some embodiments a scheduler determines the final decision whether or not this cell-edge UE is regarded as an extreme interference AV at a certain condition (e.g. resource allocation status).

The operation of using the M-th percentile point of the cumulative distribution function (CDF) of the TUE approximation SINR as the approx-SINR threshold value is shown in FIG. 4 by step 409.

Note that in some embodiments the approx-SINR-threshold value can be set through network configuration. This however is significantly more complex than the example above and is not able to automatically adjust to the cell environment per default.

Figure 5:
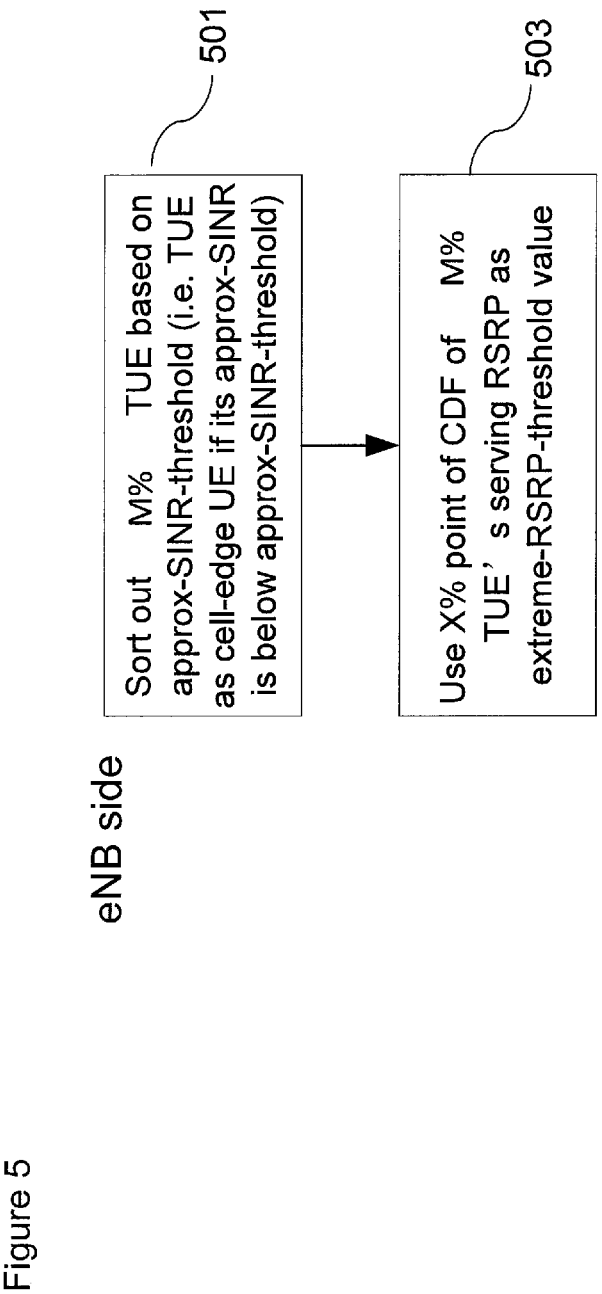
FIG. 5 shows a flow diagram of example methods for generating extreme-RSRP-threshold for the extreme interference AV identification.

With respect to FIG. 5 a flow diagram of the generation of the extreme-RSRP-threshold for extreme interference AV-UE identification is shown.

In some embodiments the access point (eNB) is configured to sort out any cell-edge TUEs based on the determined approx-SINR-threshold value. In other words the access point is configured to identify a TUE as a cell-edge UE if the approx-SINR is below the approx-SINR-threshold.

The operation of sorting or identifying any cell-edge TUEs based on the determined approx-SINR-threshold value is shown in FIG. 5 by step 501.

The access point may then in some embodiments be configured to select a X-th percentile point of CDF of serving cell RSRP values among the sorted cell-edge terrestrial UE set (in other words the TUEs with RSRP values identified in the previous operation as cell-edge TUEs) as the extreme-RSRP-threshold value. In some embodiments the value of X is a value used to eliminate the extreme cell-edge UEs which have a very low approx-SINR but have very high RSRPs within the cell-edge terrestrial UE set. This X value can in some embodiments be selected in the range between 80% and 100% and in some embodiments be based on the LTE deployment scenario. For example a UMa-AV scenario, the eNB may use 95% as X value (a value which was used in the following simulations). If a cell-edge UE's RSRP is above extreme-RSRP-threshold, it is regarded as the extreme interference AV because its RSRP is more than X-th percentile (e.g. 95% in our UMa-AV simulation assumption) point of the conventional cell-edge terrestrial UE.

The selection of the extreme-RSRP-threshold value based on the X % (X-th percentile) point of the CDF of cell edge identified TUEs is shown in FIG. 5 by step 503.

Having identified both extreme-RSRP-threshold and approx.-SINR-threshold values the identification of the extreme interference AV-UE based on approx-SINR-threshold and extreme-RSRP-threshold values can be determined at the access point (eNB) and/or the AV-UE itself.

Figure 6:
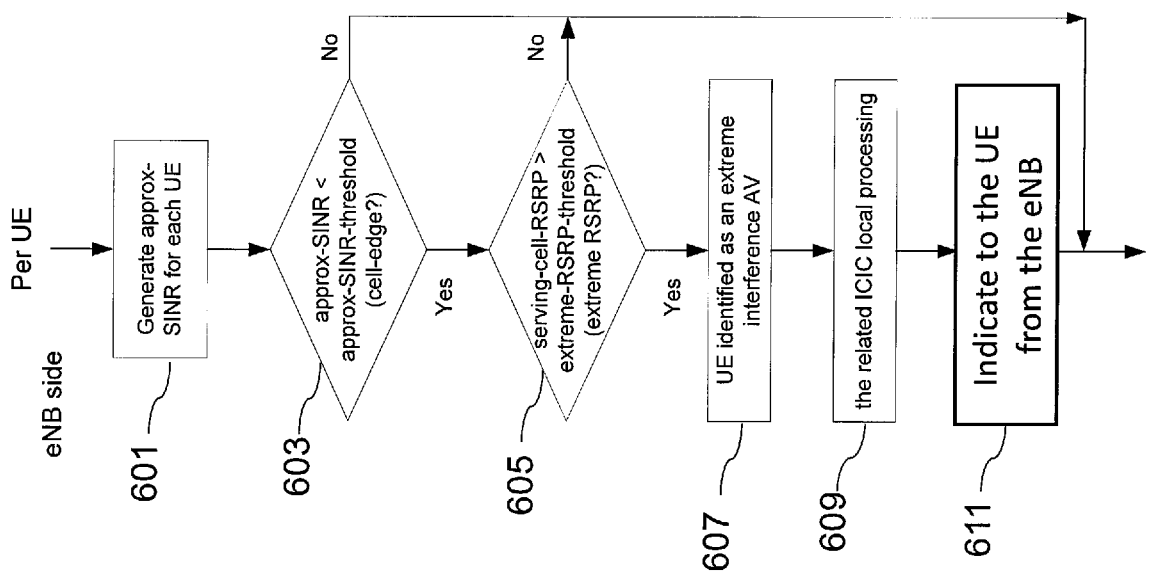
FIG. 6 shows a flow diagram of example methods for identifying the extreme interference AV based on approximate-signal to interference and noise ratio thresholds and extreme-RSRP-threshold values at the access point.

Thus for example FIG. 6 shows an example flow diagram of the identification of the extreme interference AV-UE based within an access point (eNB).

Thus for each UE the access point may in some embodiments be configured to perform the following operations:

First the approximate-SINR for the UE is determined or generated.

The operation of generating the approximate-SINR value is shown in FIG. 6 by step 601.

Then the approximate-SINR is compared against the determined approximate-SINR-threshold (the cell edge threshold determined previously).

The operation of comparing the approximate-SINR value against the approximate-SINR-threshold value is shown in FIG. 6 by step 603.

Where the approximate-SINR value is greater than (or equal to) the approximate-SINR-threshold value then the operation can move to checking the next UE. In other words the current UE being checked is not identified as an extreme interference AV-UE.

Where the approximate-SINR value is less than the approximate-SINR-threshold value then the operation can move to the next operation of comparing the serving cell RSRP value against the extreme-RSRP-threshold value.

The operation of comparing the serving cell RSRP value against the extreme-RSRP-threshold value is shown in FIG. 6 by step 605.

Where the serving cell RSRP value is less than (or equal to) the extreme-RSRP-threshold value then the operation can move to checking the next UE. In other words the current UE being checked is not identified as an extreme interference AV-UE.

Where the serving cell RSRP value is greater than the extreme-RSRP-threshold value then the operation then the UE is identified as being an extreme interference AV-UE and the operation can continue for this UE.

The operation of identifying the UE as being an extreme interference AV-UE is shown in FIG. 6 by step 607.

Furthermore in some embodiments the access point having identified the UE as being an extreme interference AV-UE is further configured to perform related inter cell interference coordination (ICIC) processing to attempt to mitigate the interference caused by the extreme interference AV-UE.

The operation of performing related ICIC processing is shown in FIG. 6 by step 609.

Furthermore in some embodiments the access point may be configured to signal or indicate to the AV-UE that it is currently an extreme interference AV-UE.

The operation of indicating to the AV-UE that it is an extreme interference AV-UE is shown in FIG. 6 by step 611.

The access point may then move onto the next UE to be checked.

Figure 7:
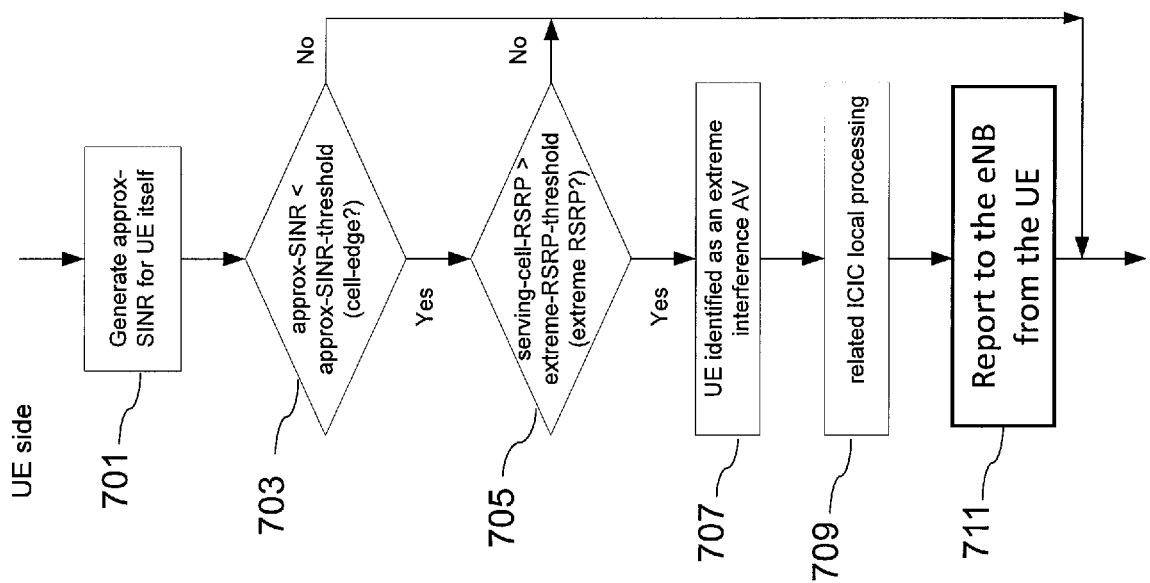
FIG. 7 shows a flow diagram of example methods for identifying the extreme interference AV based on approximate-signal to interference and noise ratio thresholds and extreme-RSRP-threshold values at the user equipment.

With respect to FIG. 7 an example flow diagram of the identification of the extreme interference AV-UE based within the UE.

First the approximate-SINR for the UE itself is determined or generated.

The operation of generating the approximate-SINR value for the UE itself is shown in FIG. 7 by step 701.

Then the approximate-SINR is compared against the determined approximate-SINR-threshold (the cell edge threshold determined previously).

The operation of comparing the approximate-SINR value against the approximate-SINR-threshold value is shown in FIG. 7 by step 703.

Where the approximate-SINR value is greater than (or equal to) the approximate-SINR-threshold value then the checking operation can end for the UE. In other words the current UE is not identified as an extreme interference AV-UE.

Where the approximate-SINR value is less than the approximate-SINR-threshold value then the checking operation can move to the next operation of comparing the serving cell RSRP value against the extreme-RSRP-threshold value.

The operation of comparing the serving cell RSRP value against the extreme-RSRP-threshold value is shown in FIG. 7 by step 705.

Where the serving cell RSRP value is less than (or equal to) the extreme-RSRP-threshold value then the checking operation can end. In other words the current UE is not identified as an extreme interference AV-UE.

Where the serving cell RSRP value is greater than the extreme-RSRP-threshold value then the operation then the UE is identified as being an extreme interference AV-UE and the checking operation can continue further.

The operation of identifying the UE as being an extreme interference AV-UE is shown in FIG. 7 by step 707.

Furthermore in some embodiments the UE having identified itself as being an extreme interference AV-UE is further configured to perform related inter cell interference coordination (ICIC) processing to attempt to mitigate the interference caused by itself (the extreme interference AV-UE).

The operation of performing related ICIC processing is shown in FIG. 7 by step 709.

Furthermore in some embodiments the UE may be configured to signal or indicate to the access point (eNB) that it is currently an extreme interference AV-UE.

The operation of indicating to the eNB that it is an extreme interference AV-UE is shown in FIG. 7 by step 711.

The UE may then end the current check.

In some embodiments the checking may be performed in both the UE and the access points.

In summary a UE may be identified as an extreme interference AV by at least one of a UE and eNB (or access point in general) if the following conditions are satisfied for the given time duration:

Condition 1: UE's approx-SINR is below the approx-SINR-threshold value, which means UE is a cell-edge UE (i.e. very low SINR).

Condition 2: UE's serving cell RSRP is above the extreme-RSRP-threshold value, which means UE gets very strong signal from its serving cell.

Figure 8:
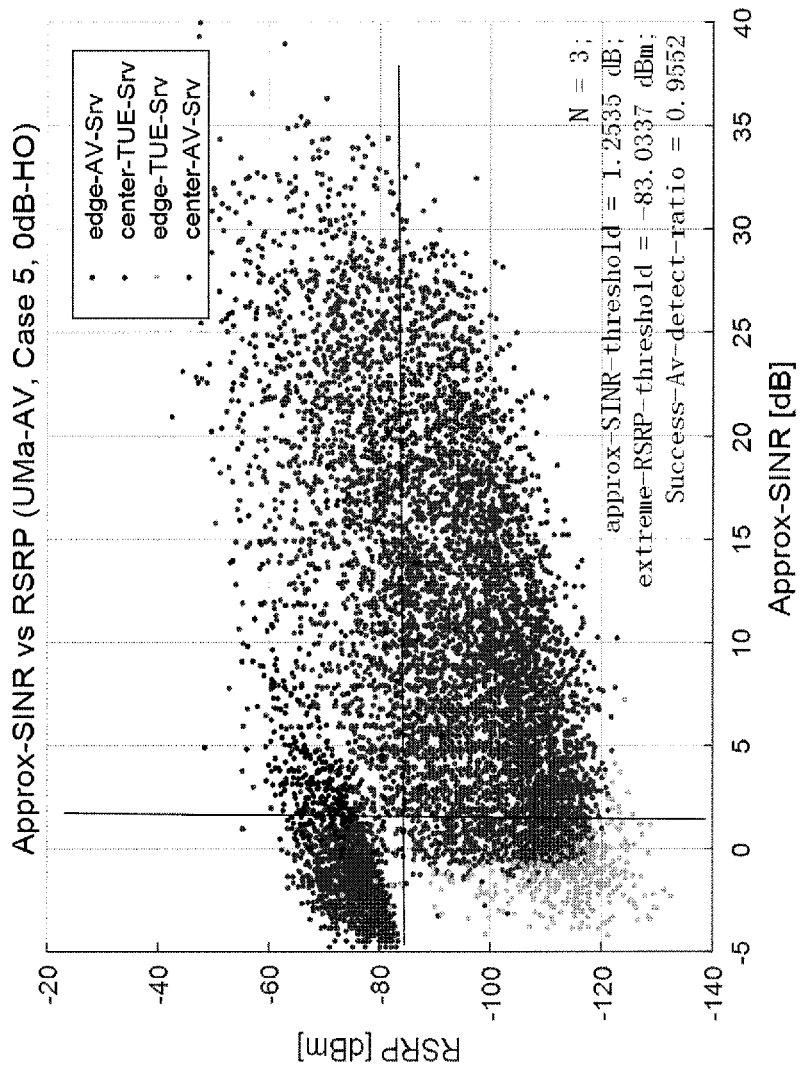
FIG. 8 shows a graph plot of simulated RSRP against approximate-signal to interference and noise ratio for a N=3 configuration.
Figure 9:
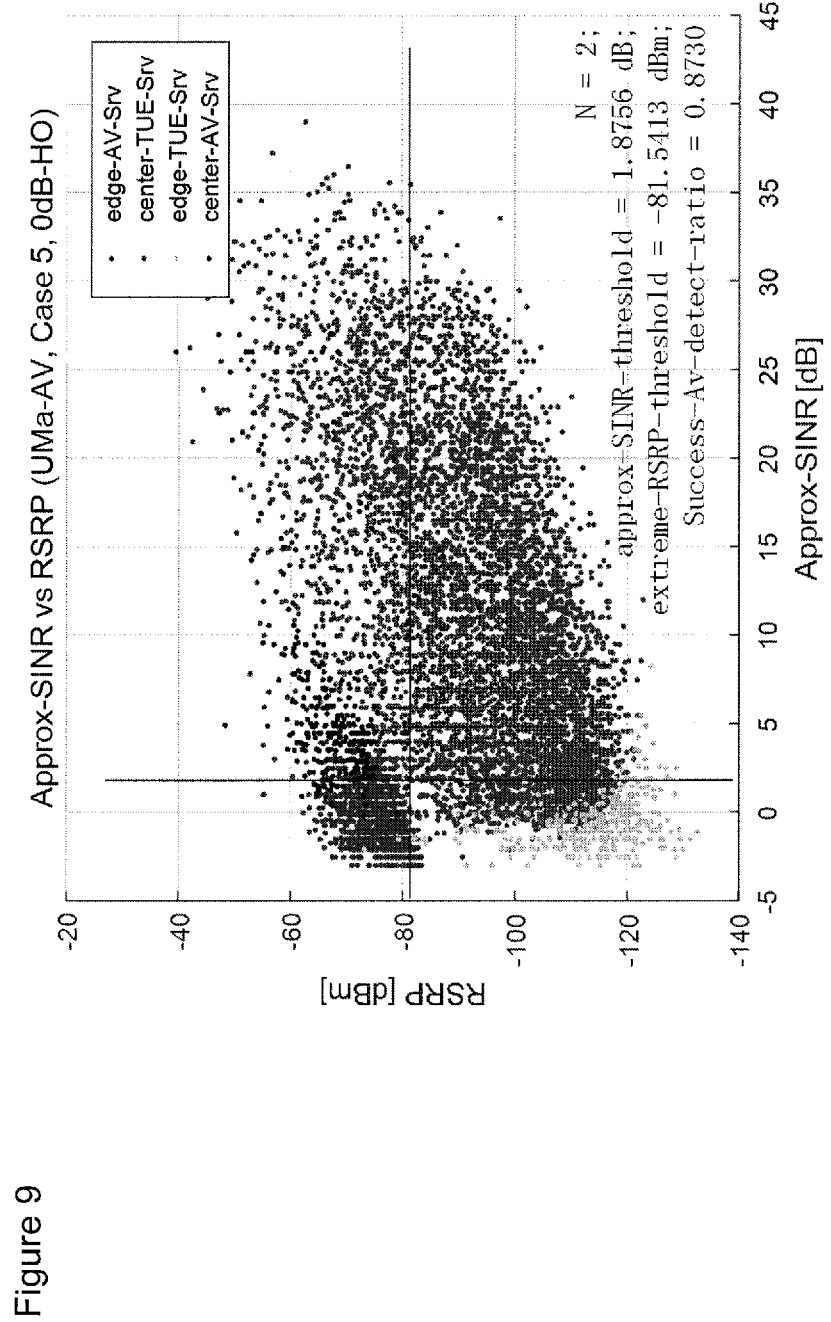
FIG. 9 shows a graph plot of simulated RSRP against approximate-signal to interference and noise ratio for a N=2 configuration.
Figure 10:
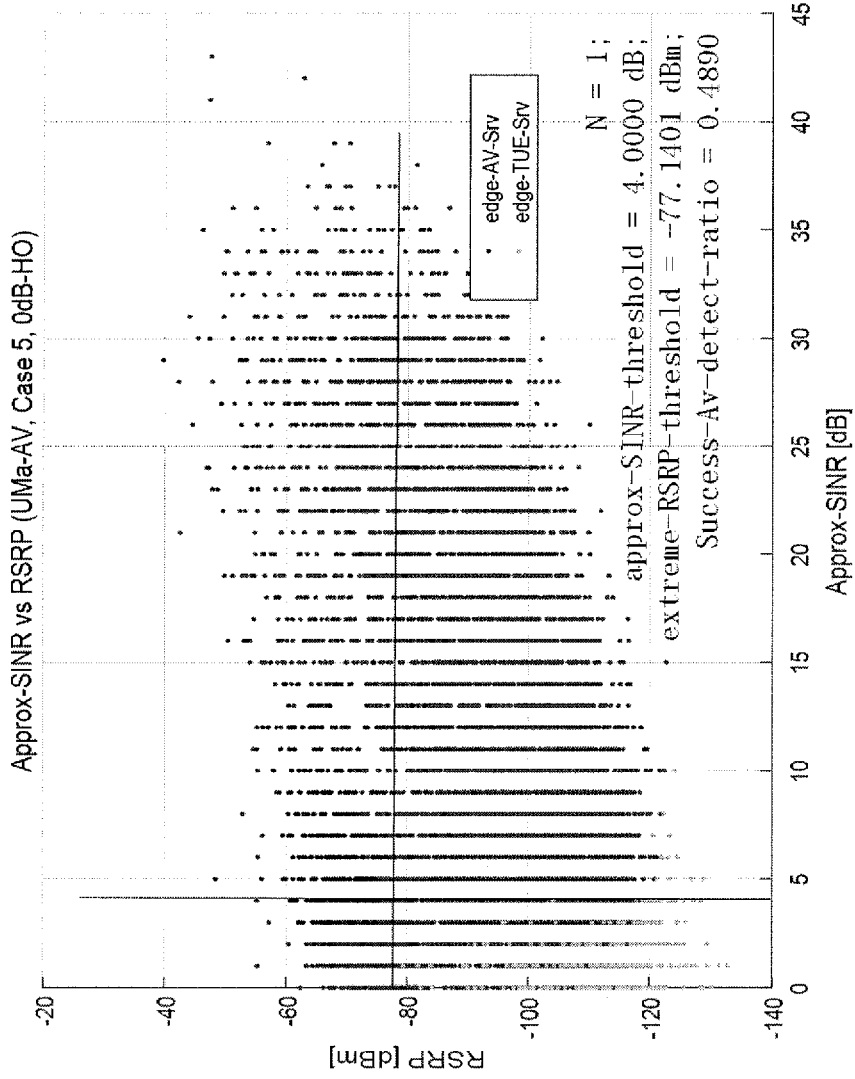
FIG. 10 shows a graph plot of simulated RSRP against approximate-signal to interference and noise ratio for a N=1 configuration.
Figure 11:
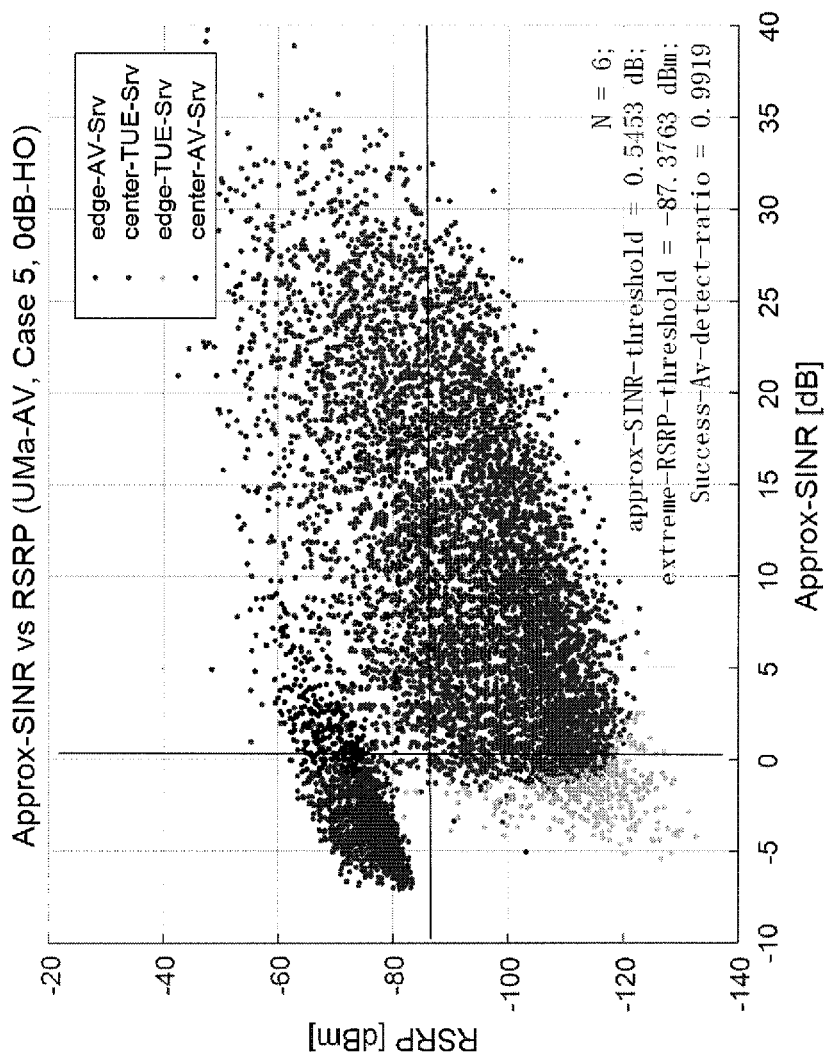
FIG. 11 shows a graph plot of simulated RSRP against approximate-signal to interference and noise ratio for a N=6 configuration.

FIGS. 8 to 11 show example simulation result plots to demonstrate the methods described above. The simulation plots show all UE's approx-SINR and RSRP distributions. In the simulation we also evaluate a detection success ratio relationship with the number N of the different neighbouring cell RSRPs. Thus for example FIG. 8 shows the approx-SINR against RSRP plots for a N=3 approx-SINR determination which can obtain 95.5% detection success ratio on the extreme interference AV under the quantized RSRP (i.e. 1 dB granularity) condition. FIG. 9 shows a similar result with a N=2 approx-SINR determination. FIG. 10 shows a N=1 approx-SINR determination configuration. Using only one neighboring cell configuration reduces the detection success ratio to only 48.9%. FIG. 11 shows a N=6 approx-SINR determination configuration with a simulated detection success ratio of 99.19%.

The detection success ratio is the ratio of the number of the extreme interference AVs found by the example embodiments discussed herein and the number of actual cell-edge AVs (i.e. actual extreme interference AVs). As shown in the FIGS. 8 to 11 the detection success ratio increases by increasing the number of neighboring cell RSRPs used to generate the approx-SINR. This is reflected for example by reference to FIG. 3 where when N is one the approx-SINR on AV-UE is a poor approximation to the ideal wideband SINR.

The examples shown herein suggest that a configuration of N=3 or greater would produce a very good detection success ratio.

In some embodiments, in order to reduce signalling impact, the detection or identification operations for detecting the extreme interference AV-UE is performed only at the UE side. In other words each UE performs the operations shown in FIG. 7. This is because as the number of the existing UE RSRP values reported complies with the specific requirement (e.g. traditional terrestrial UE), can be from 1 to 8 for each UE. Thus, such methods cannot always satisfy the number of RSRP (e.g. 4 RSRPs) required in the embodiments discusses above. In addition, there is potentially an issue whether these existing RSRP report interval periods satisfy an AV requirement for a flying speed of 160 KM/h. If detecting the extreme interference AV is fulfilled by AV-UE itself, these issues can be avoided and the extra signalling cost between the AV-UE and eNB avoided for the short interval period.

In such embodiments a pair of special 'dummy' mismatched values for RSRP and RSRQ may be used to indicate to the eNB that the AV-UE is an extreme interference AV-UE and furthermore that the eNB should wait until receiving new RSRP and RSRQ values and not use the dummy values.

Such embodiments require that the thresholds and the number N of the measured neighbouring cell RSRPs are indicated by the access point (eNB) to the UE. This can be implemented according to any suitable manner, for example using RRC signalling.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. A method, comprising:
    identifying an interfering aerial vehicle user equipment within a communications system, wherein identifying the interfering aerial vehicle user equipment is based on existing reports associated with the interfering aerial vehicle user equipment comprising a pair of mismatched values of reference signal received power and reference signal received quality, comprising:
    based on the identifying, determining for the interfering aerial vehicle user equipment a first signal measurement value is less than a first threshold value;
    determining for the interfering aerial vehicle user equipment a second signal measurement value related to the radio interface between the interfering aerial vehicle user equipment and a serving cell access point is greater than a second threshold value;

identifying for the serving cell access point a plurality of terrestrial user equipment;

determining for a terrestrial user equipment of the plurality of terrestrial user equipment a signal measurement value related to the radio interface between the terrestrial user equipment and the serving cell access point and further signal measurement values related to the radio interface between the terrestrial user equipment and at least one further cell access point;

determining for the terrestrial user equipment a signal measurement ratio value; and converting the signal measurement value related to the radio interface between the terrestrial user equipment and the serving cell access point and the further signal measurement values related to the radio interface between the terrestrial user equipment and at least one further cell access point to a linear scale, wherein the first signal measurement value is determined based on a comparison between the second signal measurement value and further signal measurement values related to the radio interface between the interfering aerial vehicle user equipment and at least one further cell access point.

2. The method as claimed in claim 1, wherein the second signal measurement value is the reference signal received power value, the reference signal being received by the interfering aerial vehicle user equipment and transmitted by the serving cell access point.

3. The method as claimed in claim 1, wherein the further signal measurement values related to the radio interface between the interfering aerial vehicle user equipment and at least one further cell access point is at least one further cell reference signal received power value, related to a reference signal transmitted by the at least one further cell access point and received by the interfering aerial vehicle user equipment.

4. The method as claimed in claim 1, wherein the first signal measurement value is an approximation to a wideband signal to interference and noise ratio, and wherein the existing reports comprise an interference and noise ratio using a pair of mismatched values comprising reference signal received power and reference signal received quality values, wherein this pair of mismatched values never appears in the terrestrial user equipment at the same time.

5. The method as claimed in claim 1, further comprising determining the first signal measurement value by:
determining the second signal measurement value related to the radio interface between the interfering aerial vehicle user equipment and a serving cell access point;
determining the further signal measurement values related to the radio interface between the interfering aerial vehicle user equipment and at least one further cell access point;
converting the second signal measurement value and the further signal measurement values to the linear scale;
computing a ratio between the converted second signal measurement value and converted further signal measurement values as the first signal measurement value.

6. An apparatus comprising:
at least one processor, and
at least one non-transitory memory storing instructions, that when executed by the at least one processor, cause the apparatus to:
identify an interfering aerial vehicle user equipment within a communications system, wherein identifying the interfering aerial vehicle user equipment is based on existing reports associated with the interfering aerial vehicle user equipment comprising a pair of mismatched values of reference signal received power and reference signal received quality; comprising:

based on the identifying, determine for the interfering aerial vehicle user equipment a first signal measurement value is less than a first threshold value;

determine for the interfering aerial vehicle user equipment a second signal measurement value related to the radio interface between the interfering aerial vehicle user equipment and a serving cell access point is greater than a second threshold value;

identify for the serving cell access point a plurality of terrestrial user equipment;

determine for a terrestrial user equipment of the plurality of terrestrial user equipment a signal measurement value related to the radio interface between the terrestrial user equipment and the serving cell access point and further signal measurement values related to the radio interface between the terrestrial user equipment and at least one further cell access point;

determine for the terrestrial user equipment a signal measurement ratio value; and convert the signal measurement value related to the radio interface between the terrestrial user equipment and the serving cell access point and the further signal measurement values related to the radio interface between the terrestrial user equipment and at least one further cell access point to a linear scale, wherein the first signal measurement value is determined based on a comparison between the second signal measurement value and further signal measurement values related to the radio interface between the interfering aerial vehicle user equipment and at least one further cell access point.

7. The apparatus as claimed in claim 6, wherein the second signal measurement value is the reference signal received power value being received by the interfering aerial vehicle user equipment and transmitted by the serving cell access point.

8. The apparatus as claimed in claim 7, wherein the further signal measurement values related to the radio interface between the interfering aerial vehicle user equipment and at least one further cell access point is at least one further cell reference signal received power value, related to a reference signal transmitted by the at least one further cell access point and received by the interfering aerial vehicle user equipment.

9. The apparatus as claimed in claim 7, wherein the at least one non-transitory memory is storing instructions executed by the at least one processor, to cause the apparatus to determine at least one of the first threshold value and the second threshold value by determining a network planning parameter.

10. The apparatus as claimed in claim 9 comprises the serving cell access point.

11. The apparatus as claimed in claim 6, wherein the first signal measurement value is an approximation to a wideband signal to interference and noise ratio, and wherein the existing reports comprise an interference and noise ratio using a pair of mismatched values comprising reference signal received power and reference signal received quality values, wherein this pair of mismatched values never appears in the terrestrial user equipment at the same time.

12. The apparatus as claimed in claim 6, wherein the at least one non-transitory memory is storing instructions executed by the at least one processor, to cause the apparatus to determine the first signal measurement value by being caused to:

determine the second signal measurement value related to the radio interface between the interfering aerial vehicle user equipment and a serving cell access point;

determine the further signal measurement values related to the radio interface between the interfering aerial vehicle user equipment and at least one further cell access point;

convert the second signal measurement value and the further signal measurement values to the linear scale;

compute a ratio between the converted second signal measurement value and converted further signal measurement values as the first signal measurement value.

13. The apparatus as claimed in claim 6, wherein the at least one memory and the computer program code are configured, with the at least one processor, to cause the apparatus to determine the first threshold value, wherein the processor caused to determine the first threshold value is caused to:

compute a ratio between the converted signal measurement value related to the radio interface between the terrestrial user equipment and the serving cell access point and converted further signal measurement values related to the radio interface between the terrestrial user equipment and at least one further cell access point as the measurement ratio value; and identify a percentile point of a cumulative distribution function of the identified terrestrial user equipment signal measurement ratio values as the first threshold value.

14. The apparatus as claimed in claim 6, wherein the first threshold value comprises to a cell-edge threshold.

15. The apparatus as claimed in claim 6, wherein the at least non-transitory one memory is storing instructions executed by the at least one processor, to cause the apparatus to determine the second threshold value by being caused to:

identify for the serving cell access point terrestrial user equipment with signal measurement ratio values below the first threshold value as cell-edge terrestrial user equipment; and identify a percentile point of the cumulative distribution function of the identified cell-edge terrestrial user equipment signal measurement values related to the radio interface between the identified user equipment and the serving cell access point as the second threshold value.

16. The apparatus as claimed in claim 6, comprises at least one of:

the serving cell access point; and the interfering aerial vehicle user equipment.

17. The apparatus as claimed in claim 16, wherein the apparatus is the serving cell access point, wherein the at least one non-transitory memory is storing instructions executed by the at least one processor, to cause the apparatus to signal from the serving cell access point to the interfering aerial vehicle user equipment that the interfering aerial vehicle user equipment is an extreme interfering aerial vehicle user equipment.

18. The apparatus as claimed in claim 16, wherein the apparatus is the interfering aerial vehicle user equipment, wherein the at least one non-transitory memory is storing instructions executed by the at least one processor, to cause the apparatus to signal from the interfering aerial vehicle user equipment to the serving cell access point that the interfering aerial vehicle user equipment is an extreme interfering aerial vehicle user equipment.

19. The apparatus as claimed in claim 6, wherein the at least one non-transitory memory is storing instructions executed by the at least one processor, to cause the apparatus to perform at least one of:

interference control for the identified interfering aerial vehicle user equipment; and interference control for the identified interfering aerial vehicle user equipment, the interfering aerial vehicle user equipment identified by an indicator.

20. A non-transitory computer readable medium comprising program instructions for causing an apparatus to perform at least:

identifying an interfering aerial vehicle user equipment within a communications system, wherein identifying the interfering aerial vehicle user equipment is based on existing reports associated with the interfering aerial vehicle user equipment comprising a pair of mismatched values of reference signal received power and reference signal received quality; comprising:

based on the identifying, determining for the interfering aerial vehicle user equipment a first signal measurement value is less than a first threshold value;

determining for the interfering aerial vehicle user equipment a second signal measurement value related to the radio interface between the interfering aerial vehicle user equipment and a serving cell access point is greater than a second threshold value;

identifying for the serving cell access point a plurality of terrestrial user equipment;

determining for a terrestrial user equipment of the plurality of terrestrial user equipment a signal measurement value related to the radio interface between the terrestrial user equipment and the serving cell access point and further signal measurement values related to the radio interface between the terrestrial user equipment and at least one further cell access point;

determining for the terrestrial user equipment a signal measurement ratio value; and converting the signal measurement value related to the radio interface between the terrestrial user equipment and the serving cell access point and the further signal measurement values related to the radio interface between the terrestrial user equipment and at least one further cell access point to a linear scale, wherein the first signal measurement value is determined based on a comparison between the second signal measurement value and further signal measurement values related to the radio interface between the interfering aerial vehicle user equipment and at least one further cell access point.

* * * * *